United States Patent [19]

Shim

[11] Patent Number: 5,583,579
[45] Date of Patent: Dec. 10, 1996

[54] TWO-DIMENSIONAL ADAPTATION TYPE LUMINANCE/CHROMINANCE SIGNAL SEPARATION APPARATATUS

[75] Inventor: Dae-Yun Shim, Seoul, Rep. of Korea

[73] Assignee: Samsung Electronics Co., Ltd., Kyungki-Do, Rep. of Korea

[21] Appl. No.: 139,160

[22] Filed: Oct. 20, 1993

[30] Foreign Application Priority Data

Oct. 20, 1992 [KR] Rep. of Korea ............... 92-19222

[51] Int. Cl.⁶ ....................................... H04N 9/78
[52] U.S. Cl. .................... 348/668; 348/665; 348/663
[58] Field of Search ................. 358/31; 348/668, 348/665, 663; H04N 9/78

[56] References Cited

U.S. PATENT DOCUMENTS

| | | | |
|---|---|---|---|
| 4,050,084 | 9/1977 | Rossi | 348/665 |
| 4,707,732 | 11/1987 | Matono et al. | 358/31 |
| 5,093,715 | 3/1992 | Tokuhara et al. | 358/31 |
| 5,134,467 | 7/1992 | Kim | 358/31 |
| 5,146,318 | 9/1992 | Ishizuka et al. | 358/31 |
| 5,194,943 | 3/1993 | Sim et al. | 358/31 |

FOREIGN PATENT DOCUMENTS

| | | | |
|---|---|---|---|
| 313372 | 4/1989 | European Pat. Off. | H04N 9/78 |
| 29486 | 7/1991 | Japan | H04N 9/78 |
| 161155 | 6/1993 | Japan | H04N 9/78 |
| 244885 | 11/1991 | United Kingdom | H04N 9/78 |

*Primary Examiner*—John K. Peng
*Assistant Examiner*—Glenton B. Burgess
*Attorney, Agent, or Firm*—Sughrue, Mion, Zinn, Macpeak & Seas

[57] ABSTRACT

A two-dimensional adaptation type luminance/chrominance signal separation apparatus for separating the luminance signal from the chrominance signal in accordance with correlation in a vertical direction includes a coefficient generator for generating a selection signal and mixing coefficients according to correlation of composite video signals, a chrominance signal processor for selectively outputting the chrominance signals filtered from the composite video signals according to the coefficients generated from the coefficient generator whereas the chrominance signals are generated by mixing respective chrominance signal filtered through a predetermined region, and a luminance signal generator for detecting a chrominance signal generated from the chrominance signal processor and a luminance signal generated from the composite video signal.

19 Claims, 8 Drawing Sheets

TWO-DIMENSIONAL ADAPTATION TYPE LUMINANCE/CHROMINANCE SIGNAL SEPARATION APPARATATUS

BACKGROUND OF THE INVENTION

1. Field of the Invention

The present invention relates to a luminance/chrominance signal separation apparatus for a composite video signal, and more particularly to a two-dimensional adaptation type luminance/chrominance signal separation apparatus for separating the luminance signal from the chrominance signal in accordance with a correlation to a vertical direction.

2. Description of the Related Art

The present invention can be applied in the same principle to various existing color television methods such as National Television System Committee (NTSC), Phase Alteration by Line (PAL), Sequential Couleur a Memoire (SECAM) and the like. However, for the sake of convenience, the present invention will be described with respect to the composite video signal of NTSC television method by way of example.

The composite video signal of NTSC method comprises a luminance signal, a chrominance signal and a synchronous signal. The chrominance signal is in turn realized in a shape of color difference signals (R-Y, B-Y) or a Quadrature Modulation of I/Q signals.

Figure 1:
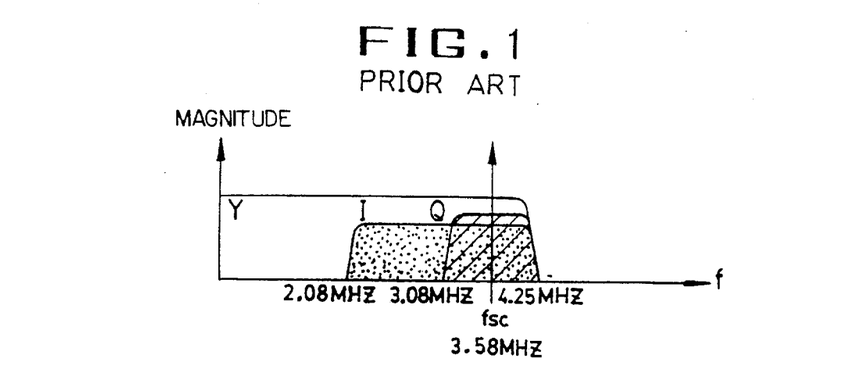
FIG. 1 is a diagram for showing a construction of a composite video signal in accordance with the NTSC method.

FIG. 1 is a drawing for illustrating a construction of a composite video signal in accordance with NTSC method.

As illustrated in FIG. 1, the luminance signal Y has a signal band of approximately 4.3 MHz, and the chrominance signals I and Q have bandwidths of 2.17 MHz and 1.17 MHz respectively centered around a chrominance subcarrier (fsc= 3.58).

Assuming that the composite video signal is V(t), the luminance signal is Y(t) and the chrominance signal C(t), then the composite video signal can be obtained by the following formula [1].

$$V(t)=Y(t)+C(t) \qquad \text{Formula 1.}$$

The chrominance signal C(t) can be obtained by the following formula [2] for the quadrature-modulated signals of I(t) and Q(t).

$$C(t)=I(t)\cos(2\,f_{sc}t)+Q(t)\sin(2\,f_{sc}t) \qquad \text{Formula 2.}$$

It will be noted that fsc is approximately 3.58 MHz, i.e., the carrier frequency of the chrominance signal.

According to NTSC method, a relationship of the following formula [3] can be formed between the carrier frequency (fsc) of the chrominance signal and a frequency of horizontal synchronous signal fh.

$$f_{sc}=(455/2)f_h \qquad \text{Formula 3.}$$

A method using a filter has been disclosed as a way by which the luminance signal and chrominance signal can be simply separated from the composite video signal having a construction as illustrated in FIG. 1.

In other words, the luminance signal is separated by means of a Low-Pass Filter (LPF) and the chrominance signal is separated by a Band-Pass Filter (BPF) having a band near 3.58 MHz.

This kind of method, however, cannot produce a satisfactory picture due to a generation of cross-talk between the luminance and chrominance signals in bands beyond 2 MHz where the luminance signal and chrominance signal are mixed.

Figure 2:
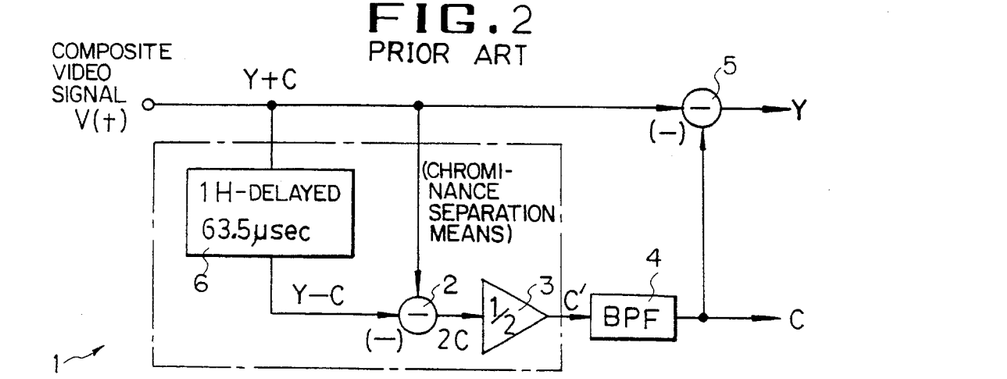
FIG. 2 is a block diagram for showing a conventional luminance/chrominance signal separation apparatus utilizing a line comb filter.

FIG. 2 is a drawing showing a luminance/chrominance separation apparatus utilizing a Line Comb Filter, i.e., a circuit for showing a method utilizing a chrominance signal phase difference between horizontal scanning lines.

In FIG. 2, assuming a composite video signal Vi(t) represents an i-th horizontal scanning line, then Vi(t) can be obtained by the following formula [4].

$$V_i(t)=Y_i(t)+C_i(t) \qquad \text{Formula 4.}$$

Thus, a composite picture signal Vi+1 (t) for the i+1th horizontal scanning line can be obtained by the following formula [5].

$$V_{i+1}(t)=Y_{i+1}(t)-C_{i+1}(t) \qquad \text{Formula 5.}$$

Accordingly, a chrominance signal C' can be obtained by delaying the horizontal scanning line as much as one line 1H (where; H denotes a period of the horizontal scanning line), subtracting a front and a rear scanning signal thereof and then by dividing by 1½.

The chrominance signal C' thus obtained is caused to pass BPF to thereby obtain a final chrominance signal C. The luminance signal Y can be obtained simply by, subtracting the chrominance signal C from the composite video signal V(t) being input.

The apparatus for separating the luminance and chrominance signals by means of the Line Comb Filter (LCF) as illustrated in FIG. 2 can obtain an improved picture with no cross-talk between the luminance signal and chrominance signal in the case of the picture possesses a vertical correlation. However, in the case of a picture with no correlation or a picture with few correlations, a phenomenon called hanging dot is generated to thereby deteriorate the picture quality.

Figure 3:
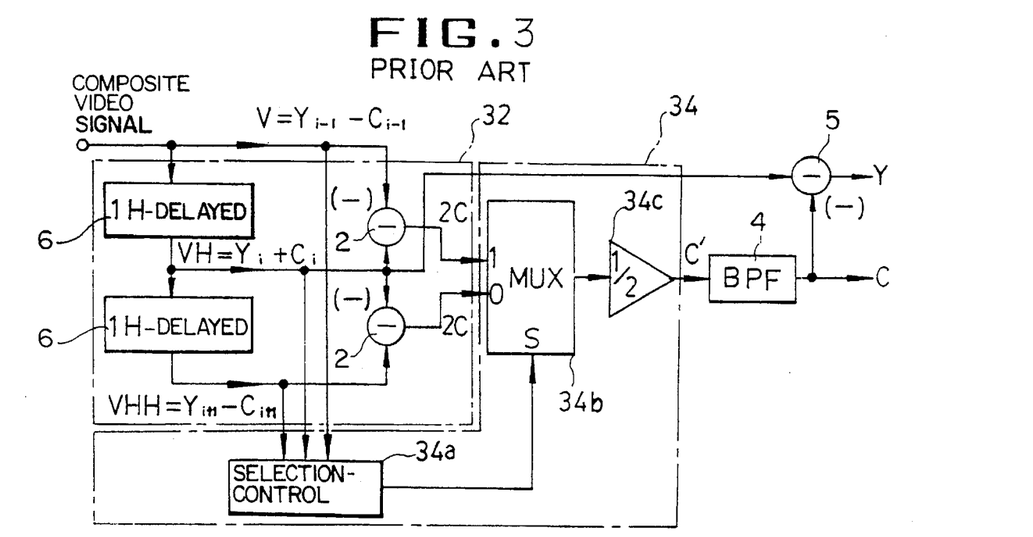
FIG. 3 is a block diagram for showing a conventional adaptation type luminance/chrominance signal separation apparatus.

An adaptation type luminance and chrominance signal separation apparatus for improving the aforesaid drawback is illustrated in FIG. 3.

According to FIG. 3, a detecting circuit 32 detects a composite video signal V being input, a signal VH, 1H-delayed therefrom and a signal VHH, 2H-delayed therefrom, and obtains a chrominance signal 2C from V and VH, and obtains a chrominance signal 2C also from VH and VHH.

A selection control unit 34a of a selection circuit 34 outputs a selection signal according to a correlation among V, VH and VHH detected from the detecting means 32.

A multiplexer 34B of the selection circuit 34 selects one of the chrominance signals 2C according to an output of the selection control unit 34A, and thereby outputs the same.

A level converter 34c converts by ½ the chrominance signal output from the multiplexer 34a to thereby output the signal C'.

The chrominance signal C' obtained from the foregoing circuitry is caused to pass BPF to thereby obtain the chrominance signal C. If the chrominance signal C is subtracted from the composite video signal being input, the luminance signal Y can be obtained, which reduces the generation of the hanging dot by way of the selective output to thereby improve the picture quality.

Specifically, the method thus illustrated by FIG. 3 is mainly applied to a digital comb filter utilizing digital signal processing or a Charge Coupled Device (CCD) comb filter. The method is cheaper in cost when compared with a three-dimensional process (a process on a time axis in addition to a two-dimensional vertical and horizontal process) and can easily be realized, which makes the same adequate for two-dimensional Y/C separation.

Figure 4:
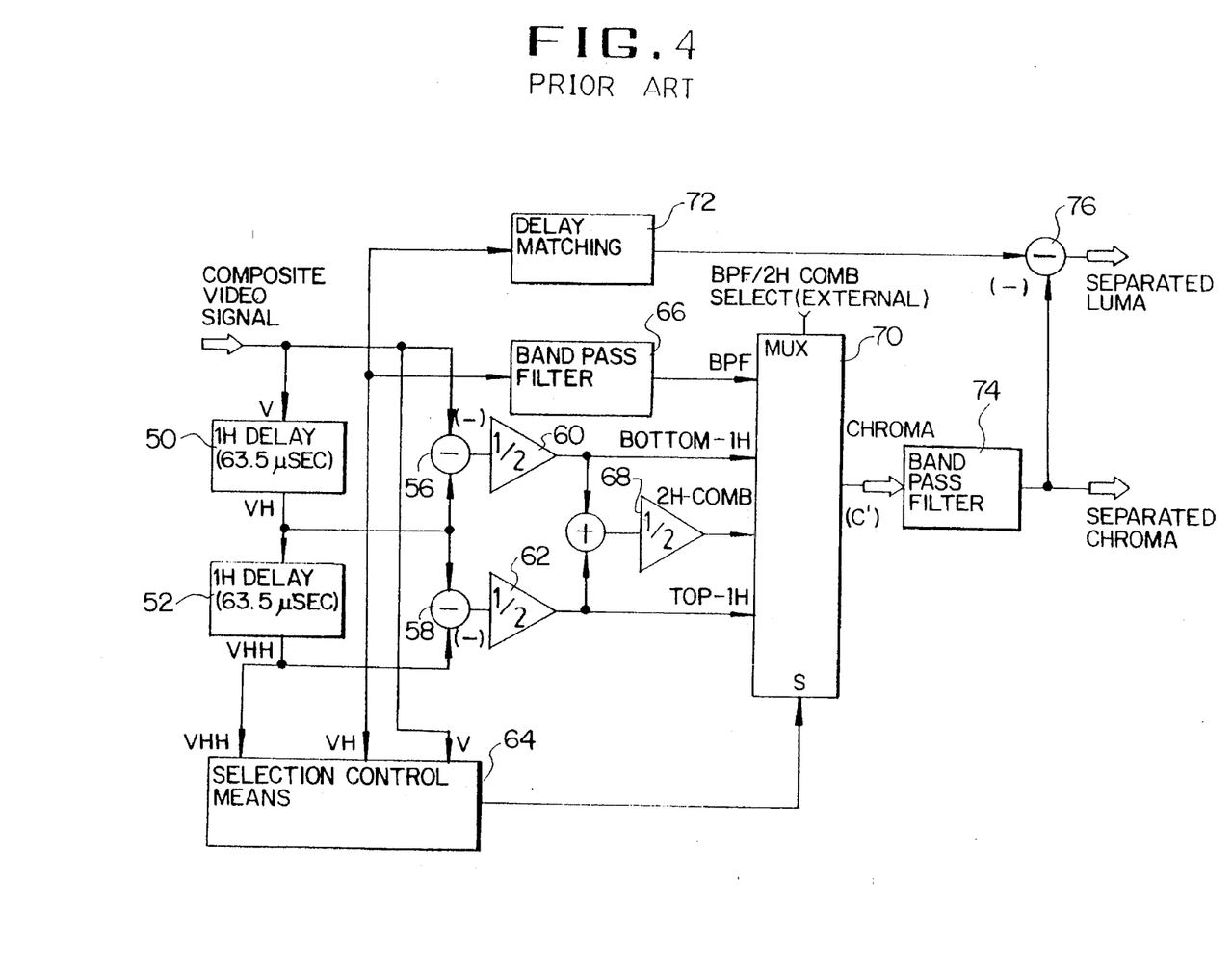
FIG. 4 is a schematic drawing of another circuit illustrating a conventional adaptation type luminance/chrominance signal separation apparatus.

FIG. 4 is a block diagram for illustrating another embodiment of a conventional adaptation type Y/C separation apparatus.

According to FIG. 4, the apparatus receives the composite video signal V being input and a signal-1H delayed thereof VH and signal 2H-delayed thereof VHH. A chrominance signal (BOTTOM- 1H), is obtained by dividing ½ the difference signal between V and VH and a chrominance signal (TOP- 1H) is obtained by dividing ½ the difference signal between VH and VHH.

Furthermore, a chrominance signal (BPF) can be obtained from VH by way of the Band-Pass Filter of chrominance signal band, which is added by the chrominance signals (BOTTOM-1H and TOP-1H), and is divided by ½ to thereby obtain a chrominance signal (2H-COMB).

The selection control unit outputs the selection signal according to the correlations between V and VH, and between VH and VHH.

The multiplexer selects one of the chrominance signals C' (BPF, BOTTOM-1H, 2H-COMB or TOP-1H) to thereby output the same in accordance with the output of the selection control unit.

The chrominance signal C' selectively output from the multiplexer becomes a final chrominance signal C after passing through the Band-Pass Filter.

Meanwhile, the luminance signal Y can be obtained by subtracting the chrominance signal C from the signal, where VH is delayedly matched.

Figure 12A:
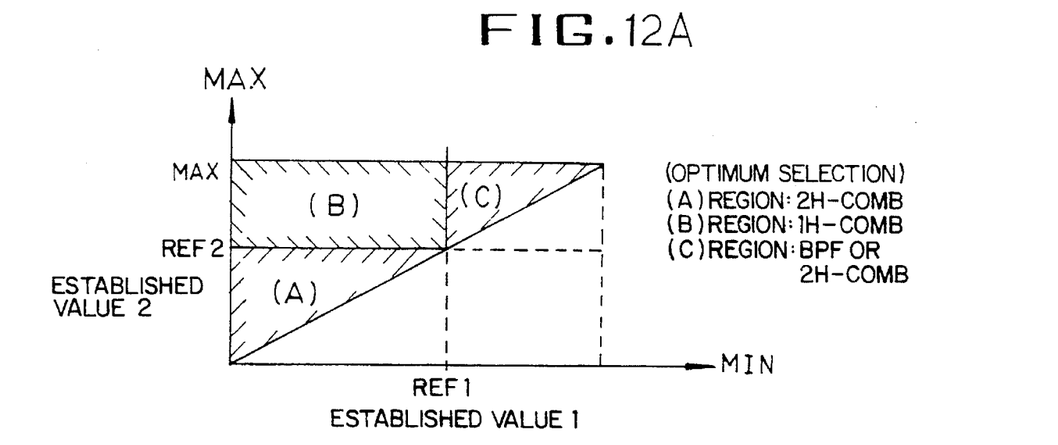
FIGS. 12A AND 12B are illustrative drawings of a two-dimensional region for illustrating operational states of the circuitry shown in FIG. 4.
Figure 12B:
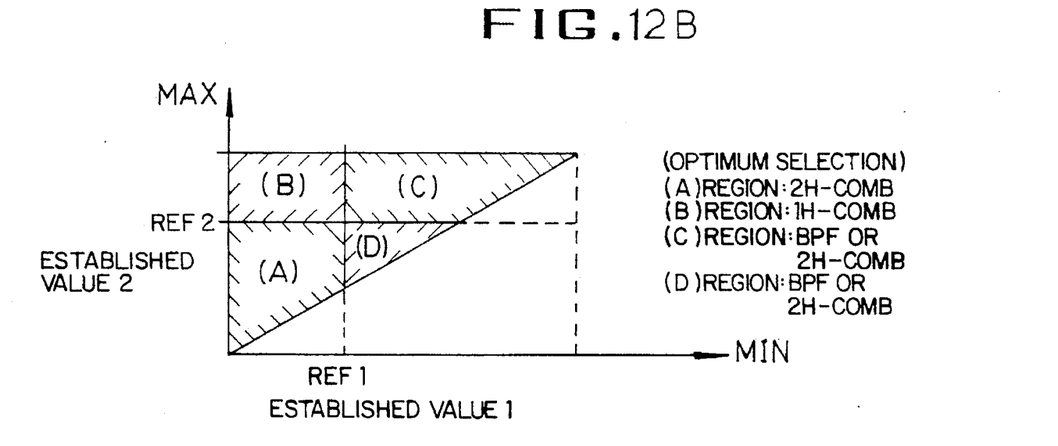

FIGS. 12A and 12B are drawings of two-dimensional region for illustrating operational states produced by the circuitry shown in FIG. 4.

According to FIG. 12A, correlations between V and VH, and between VH and VHH are obtained from the selection control unit of FIG. 4 whereby a lesser correlation is designated as MIN while a greater is designated as MAX.

Then, the region from which selection can be made from MIN and MAX exists on the upper side with a diagonal line as a center.

When respective reference values Ref1 and Ref2 are determined based on the foregoing against the MIN and MAX, and if the MIN and MAX values are smaller than the respective reference values Ref1 and Ref2, a region (2H-COMB) is selected.

In other words, if the difference between the upper and lower lines is less than a predetermined value, the selection control unit outputs a selection signal, so that the multiplexer can output the chrominance signal (2H-COMB) calculated from the V, VH and VHH.

Furthermore, if MIN is smaller than the reference value Ref1 while MAX is greater than the reference value Ref2, B region (1H-COMB) is selected so that the multiplexer can select a chrominance signal with a larger correlation among the chrominance signals (1H-COMB) to thereafter output the same.

If both MIN and MAX are larger than both references Ref1 and Ref2, which denotes that there is no correlation between the upper line and the lower line, the multiplexer is caused to select C region.

In other words, the chrominance signal BPF output from the Band-Pass Filter (BPF) or the chrominance signal (2H-COMB) calculated from V, VH and VHH is caused to be output in accordance with the selection signal randomly set by a user from the outside.

FIG. 12B is a drawing illustrating a set-up of reference values Ref1 and Ref2 in a different way from that shown in FIG. 12A wherefrom the chrominance signal BPF or 2H-COMB is output according to a selection signal randomly set by the user from the outside when MIN is greater than the reference value Ref1.

If MIN is less than the reference value Ref1, the chrominance signal 2H-COMB or 1H-COMB is selected according to MAX and the reference value Ref2, thereby outputting the same.

However, if, as described above, a selection of output is forcibly realized despite a minute difference against a value near the established values Ref1 and Ref2, the separated image becomes unnatural due to its sensitivity to the established values.

SUMMARY OF THE INVENTION

Accordingly, it is an object of the present invention to provide separated natural images by setting up two established values between which the chrominance signals are mixed to thereafter be outputted according to correlations.

In order to attain the aforementioned goals, a two-dimensional adaptation type luminance/chrominance signal separation apparatus according to the present invention comprises:

a coefficient generator for generating a selection signal and mixed coefficients according to correlation of composite video signals;

a chrominance signal processor for selectively outputting the chrominance signals filtered by the composite video signals according to the coefficients generated from the coefficient generator whereas the chrominance signals are generated by mixing respective chrominance signals filtered through a predetermined region; and a luminance signal generator for detecting a chrominance signal generated from the chrominance signal processor and a luminance signal generated from the composite video signal.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE PREFERRED EMBODIMENTS

Figure 5:
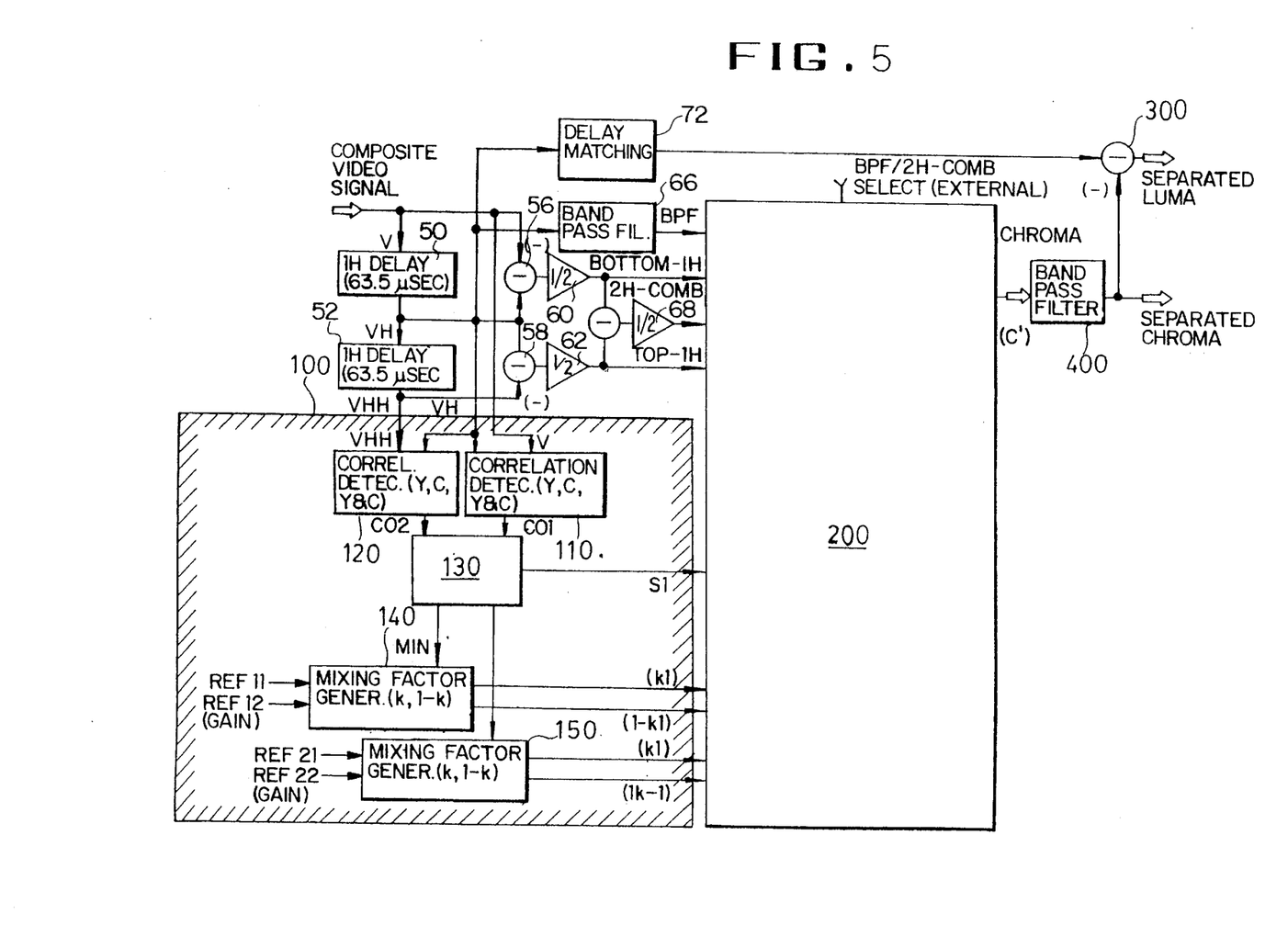
FIG. 5 is a block diagram for illustrating a two-dimensional adaptation type luminance/chrominance signal separation apparatus in accordance with the present invention.

FIG. 5 is a block diagram for illustrating a two-dimensional adaptation type luminance/chrominance signal separation apparatus in accordance with the present invention.

In order to attain the aforementioned goals, a two-dimensional adaptation type luminance/chrominance signal separation apparatus according to the present invention comprises:

a coefficient generator 100 for generating a selection signal S1 and mixing coefficients (K1, 1-K1, K2, 1-K2) according to correlations between versions of the composite video signals (V, VH, VHH);

a chrominance signal processor 200 for selectively outputting the chrominance signals filtered from the composite video signals (V, VH, VHH) according to the coefficients (K1, 1-K1, K2, 1-K2) generated by the coefficient generator 100 whereas the chrominance signals are generated by mixing respective chrominance signals (BPF, BOTTOM-1H, 2H-COMB, TOP-1H) filtered through a predetermined region; and a luminance signal generator 300 for combining a chrominance signal C generated from the chrominance signal processor 200 with the composite video signal to generate luminance signal ˆ.

Furthermore, an output terminal of the chrominance signal processor 200 can be applied to a Band-Pass Filter 400 for passing only a selected chrominance signal region to thereby obtain the chrominance signal C from which noises and the like have been removed.

The coefficient generator 100 thus described advantageously includes:

correlation detectors 110 and 120 for generating correlation coefficients CO1 and CO2 in accordance with correlations between the composite video signal V currently being input and composite video signals VH and VHH, respectively, 1H and 2H delayed;

a correlation determination device 130 for dividing and outputting the correlation coefficients CO1 and CO2 generated from the correlation detectors 110 and 120 in accordance with a greater value MAX and a lesser value MIN and for outputting a selection signal S1 for causing selection of a signal of greater correlation from filtered chrominance signals (BPF, BOTTOM-1H, 2H-COMB, TOP-1H); and mixing coefficient generators 140 and 150 for generating mixing coefficients (K1, 1-K1) (K2, 1-K2) from the correlation coefficients output from the correlation determination device in accordance with the greater value MAX and the lesser value MIN.

Figure 6A:
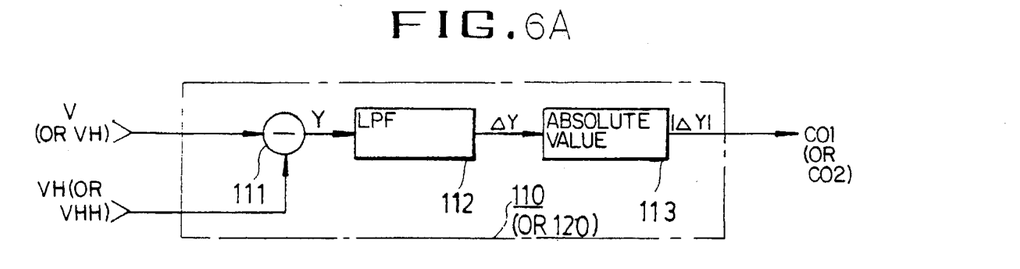
FIGS. 6A, 6B and 6C are block diagrams for collectively illustrating an embodiment of a correlation detector as shown in FIG. 5.
Figure 6B:
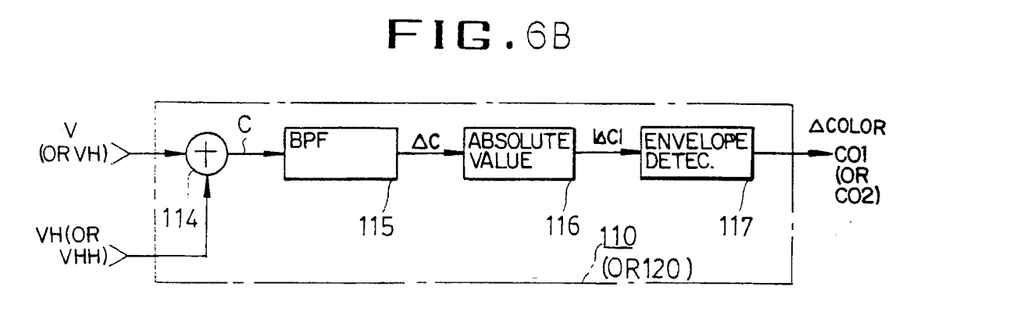
Figure 6C:
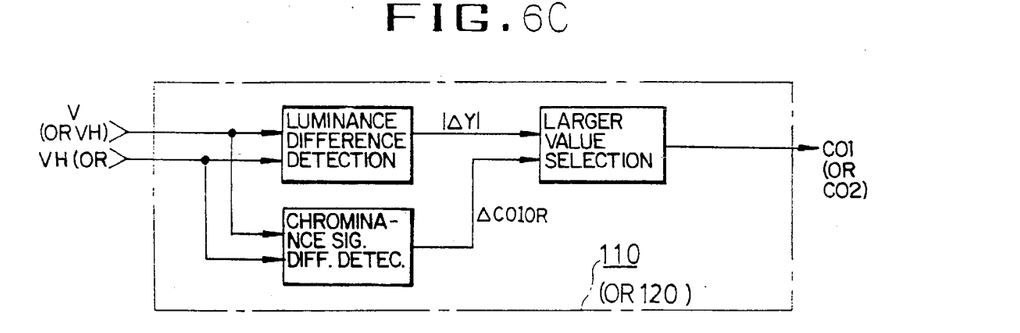

FIGS. 6A and 6C are block diagrams for illustrating an embodiment of correlation detectors (110 or 120) as shown in FIG. 5.

FIG. 6A shows a schematic drawing for illustrating a circuit implementing a luminance difference detecting method where a subtractor 111 seeks a difference between the composite video signal being input as V and 1H-delayed composite video signal VH.

In other words, the luminance signal Y is obtained.

A Low-Pass Filter 112 passes a noise-limited luminance signal ΔY from the luminance signal Y output from the subtractor 111.

An absolute value unit 113 obtains an absolute value |ΔY| of the luminance signal ΔY output from the Low-Pass Filter 112, thereby outputting the same as a first correlation coefficient CO1.

FIG. 6B shows a drawing for illustrating a circuit providing a chrominance signal difference detecting method where a subtractor 114 seeks a difference between the composite video signal V being input and the 1H-delayed composite video signal VH.

In other words, the chrominance signal C is obtained.

A Band-Pass Filter 115 passes a noise-limited chrominance signal ΔC from the chrominance signal C output from the subtractor 114.

An absolute value unit 116 obtains an absolute value |ΔC| of the chrominance signal ΔC output from the Band-Pass Filter 115.

An envelope detecting unit 117 detects an envelope from the absolute value |ΔC| of the chrominance signal to thereby output the same as the first correlation coefficient CO1.

FIG. 6C is a drawing for illustrating a circuit providing a luminance/chrominance signal difference detecting method where a greater value is selected among the values obtained by the luminance difference detecting method shown in FIG. 6A and obtained by the chrominance signal difference detecting method shown in FIG. 6B to thereby be output as the first correlation coefficient CO1.

In FIGS. 6A, 6B and 6C, the first correlation detector 110 has been explained by way of example but the second correlation detector 120 is operated in the same manner as described above to thereby generate the second correlation coefficient CO2 in accordance with the 1H-delayed composite video signal VH and 2H-delayed composite video signal VHH.

Figure 7:
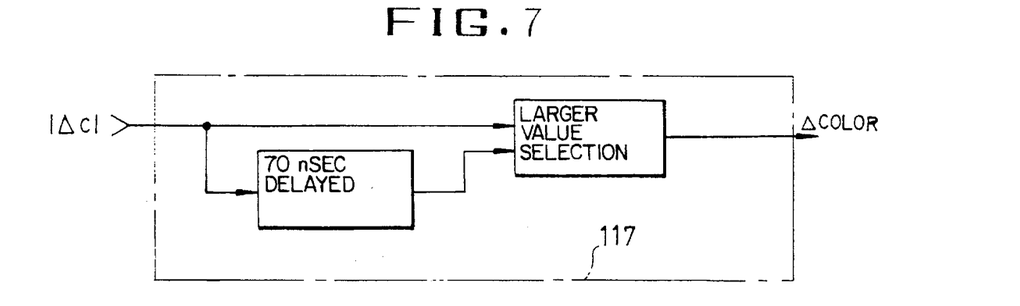
FIG. 7 is a schematic diagram of an envelope detector as shown in FIG. 6B.

FIG. 7 is a schematic diagram of the envelope detector 117 shown in FIG. 6B.

According to FIG. 7, the envelope detector 117 selects a greater value from the values which represent the delayed absolute value |ΔC| of the chrominance signal and the absolute value |ΔC| of the chrominance signal.

Figure 8:
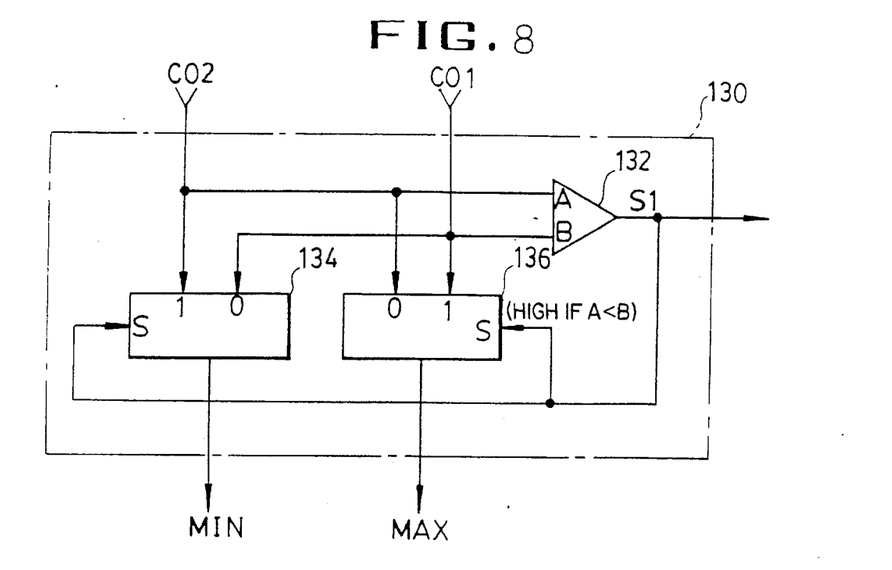
FIG. 8 is a schematic diagram of the correlation determination device as shown in FIG. 5.

FIG. 8 is a schematic diagram of the correlation determination device 130 shown in FIG. 5.

According to FIG. 8, the correlation determination device 130 comprises: a comparator 132 for comparing the first and second correlation coefficients CO1 and CO2 output from the correlation detectors 110 and 120 to thereby output the selection signal S1; and correlation coefficient separators 134 and 136 for separately outputting a lesser correlation coefficient MIN and a greater correlation coefficient MAX according to the selection signal S1 output from the comparator 132.

Preferably, correlation coefficient separator 134 includes a first multiplexer 134 for outputting correlation coefficient MIN according to the selection signal S1 output from comparator 132.

The correlation coefficient separator 136 advantageously includes a second multiplexer 136 for outputting correlation coefficient MAX according to the selection signal S1 output from the comparator 132.

Figure 9:
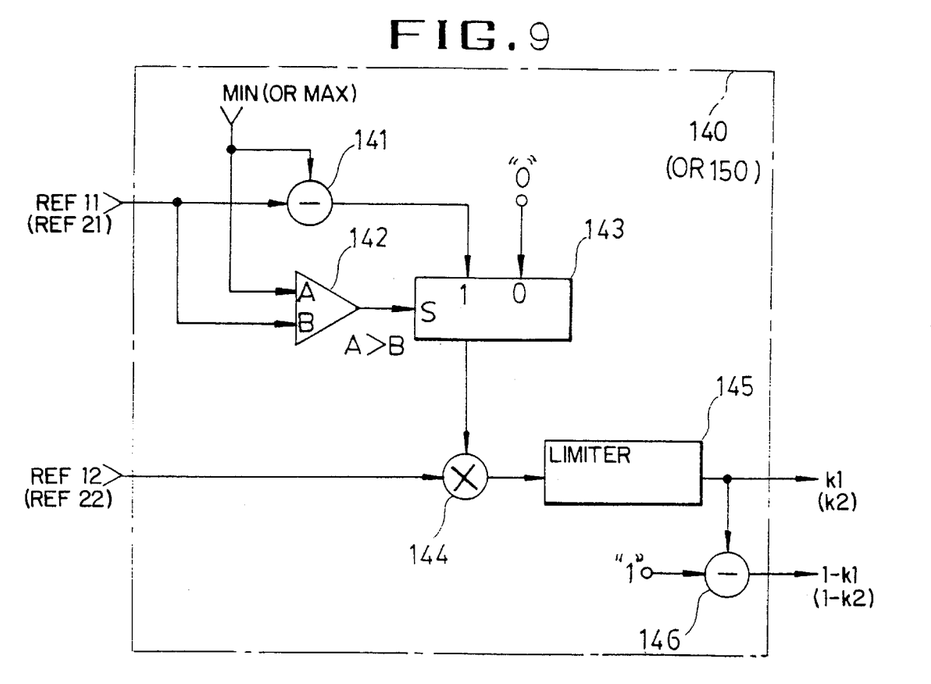
FIG. 9 is a schematic diagram of a mixing coefficient generator as shown in FIG. 5.

FIG. 9 is a schematic diagram of the mixing coefficient generators 140 or 150 shown in FIG. 5.

According to FIG. 9, the mixing coefficient generator 140 comprises: a subtractor 141 for subtracting a first reference value REF11 from correlation coefficient MIN output from the correlation determination device 130; a comparator 142 for comparing correlation coefficient MIN output from the correlation determination device 130 with the first reference value REF11 to thereby output "0" when correlation coefficient MIN is smaller than the first reference value REF11 according to the selection signal output from the comparator 142 and for outputting the correlation coefficient MIN as is when the correlation coefficient MIN is greater than the first reference value REF11; a multiplier 144 for multiplying a signal output from the multiplexer 143 by a predetermined value REF12; a limiter 145 for generating a first mixing coefficient K1 for designating as "1" an output of the multiplier 144 above a predetermined value; and a subtractor 146 for subtracting the first mixing coefficient K1 from "1" to thereby output a second mixing coefficient (1-K1).

In the description above, the mixing coefficient generator 140 has been explained by way of example. The mixing coefficient generator 150 also is operated in the same way as the above-referenced device 140 to thereby generate a third mixing coefficient K2 and a fourth mixing coefficient 1-K2 according to the correlation coefficient MAX, a second reference value REF21 and a predetermined value REF22, respectively.

Figure 10A:
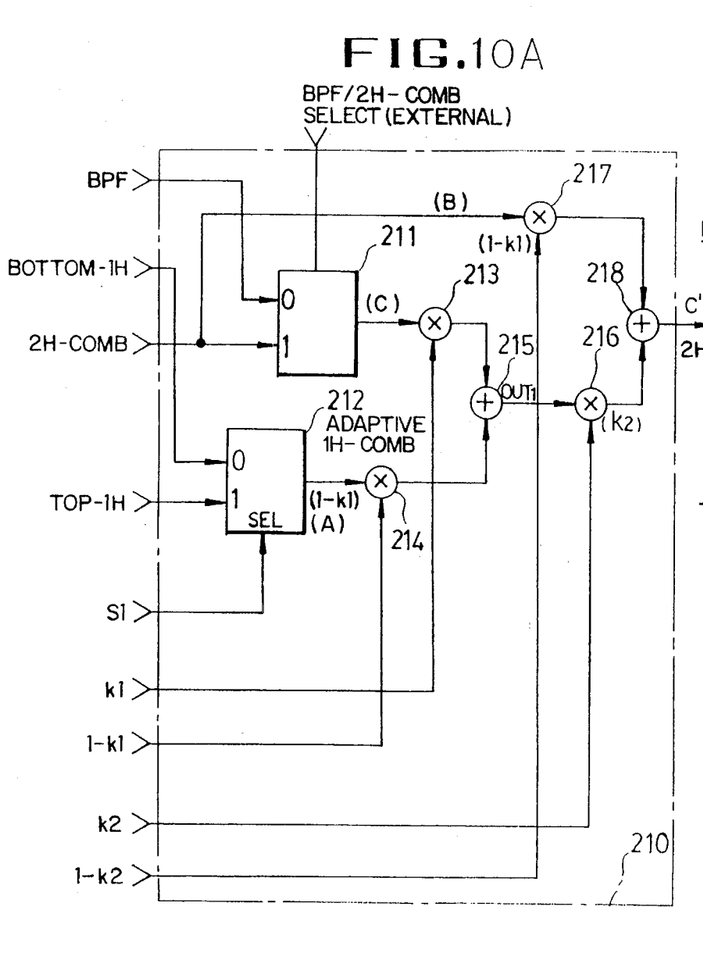
FIGS. 10A AND 10B are schematic diagrams of a chrominance signal processor as shown in FIG. 5.
Figure 10B:
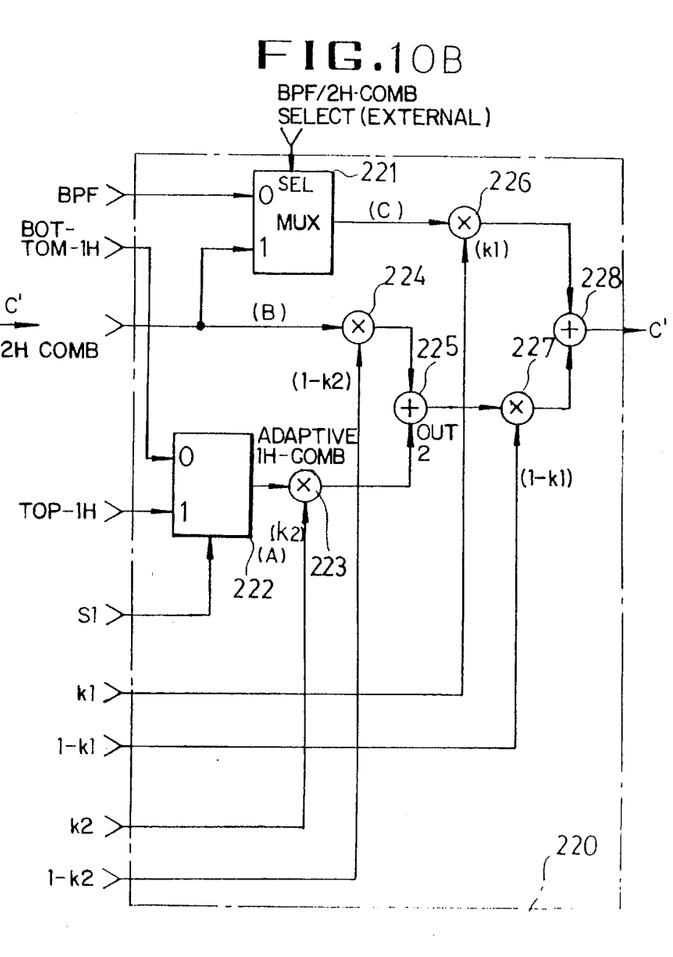

FIGS. 10A and 10B are schematic diagrams of the chrominance processor 200 shown in FIG. 5.

FIG. 10A shows a schematic diagram where the first and second mixing coefficients K1 and 1-K1 generated from the mixing coefficient generator 140 are first processed whereas the third and fourth mixing coefficients K2 and 1-K2 generated from the mixing coefficient generator 150 are processed later.

The chrominance signal processor in FIG. 10A comprises: a first multiplexer 211 for outputting the chrominance signal BPF detected by the Band-Pass Filter from the composite video signal according to an external selection or for output of the chrominance signal 2H-COMB calculated from the currently-input composite video signal V, 1H-delayed composite video signal VH and 2H-delayed composite video signal VHH; a second multiplexer 212 for selectively outputting the composite video signal V currently input according to the selection output from the correlation determination device 130, the chrominance signal BOTTOM-1H calculated from the 1H-delayed composite video signal VH or the chrominance signal TOP-1H calculated from 1H-delayed composite video signal VH or 2H-delayed composite video signal VHH; first and second multipliers 213 and 214 for multiplying the chrominance signal (BPF or 2H-COMB) (BOTTOM-1H or TOP-1H) output from the first and second multiplexers 211 and 212 by the first and second mixing coefficients K1 and 1-K1 generated from the correlation coefficient MIN; a first adder 215 for adding the chrominance signals output from the first and second multipliers 213 and 214; a third multiplier 216 for multiplying the chrominance signal output from the first adder 215 by the third mixing coefficient K2 generated from correlation coefficient MAX; a fourth multiplier 217 for multiplying the chrominance signal 2H-COMB calculated from the currently-input composite video signal V, 1H-delayed composite video signal VH and 2H-delayed composite video signal VHH by the fourth mixing coefficient 1-K2 generated from correlation coefficient MAX; and a second adder 218 for outputting a chrominance signal by adding outputs of the respective third and fourth multipliers 216 and 217.

FIG. 10B shows a schematic diagram where the third and fourth mixing coefficients K2 and 1-K2 generated from the mixing coefficient generator 150 are first processed while the first and second mixing coefficient K1 and 1-K1 generated o by the mixing coefficient generator 140 are processed later.

The chrominance signal processor in FIG. 10B comprises: a first multiplexer 221 for outputting the chrominance signal BPF detected by the Band-Pass Filter from the composite video signal according an external selection signal or for outputting the chrominance signal 2H-COMB calculated from the currently-input composite video signal V, 1H-delayed composite video signal VH and 2H-delayed composite video signal VHH; a second multiplexer 222 for selectively outputting the composite video signal V currently input according to the selection signal output from the correlation determination device 130, the chrominance signal BOTTOM-1H calculated from the 1H-delayed composite video signal VH or the chrominance signal TOP- 1H calculated from 1H-delayed composite video signal VH or 2H-delayed composite video signal VHH; a first multiplier 223 for multiplying the chrominance signal 9BOTTOM-1H or TOP-1H) selectively output from the second multiplexer 222 by the third mixing coefficient K2 generated from correlation coefficient MAX; a first adder 225 for adding the chrominance signals output from the first and second multipliers 223 and 224; a second multiplier 224 for multiplying the chrominance signal 2H-COMB calculated from the currently-input composite video signal V, 1H-delayed composite video signal VH and 2H-delayed composite video signal VHH by the fourth mixing coefficient 1-K2 generated from correlation coefficient MAX; a third multiplier 226 for multiplying the chrominance signal (BPF or 2H-COMB) output from the first multiplexer 221 by the first mixing coefficient K1 generated from correlation coefficient MIN; a fourth multiplier 227 for multiplying the chrominance signal output from the first adder 225 by the second mixing coefficient 1-K1 generated from correlation coefficient MIN; and a o second adder 228 for output of a chrominance signal by adding outputs of the third and fourth multipliers 226 and 227.

Meanwhile, the chrominance signal BPF input to the chrominance signal processor as illustrated in FIGS. 10A and 10B can be detected by the 1H-delayed composite video signal VH passing through the Band-Pass Filter corresponding to a chrominance signal region.

The chrominance signal BOTTOM-1H can be obtained by a subtractor for seeking a difference between the currently-input composite video signal V and 1H-delayed composite video signal VH and by a level converter for dividing by ½ the chrominance signal output from the subtractor.

The chrominance signal TOP-1H can be calculated by a subtractor for seeking a difference between the 1H-delayed composite video signal VH and 2H-delayed composite video signal VHH and by a level converter for dividing by ½ the chrominance signal output from the subtractor.

The chrominance signal 2H-COMB can be calculated by an adder for adding the chrominance signal BOTTOM- 1H calculated from the currently-input composite video signal V and 1H-delayed composite video signal VH to the chrominance signal TOP-1H calculated from the 1H-delayed composite video signal VH and 2H-delayed composite video signal VHH, and by a level converter for dividing ½ the chrominance signal output from the adder.

Figure 11:
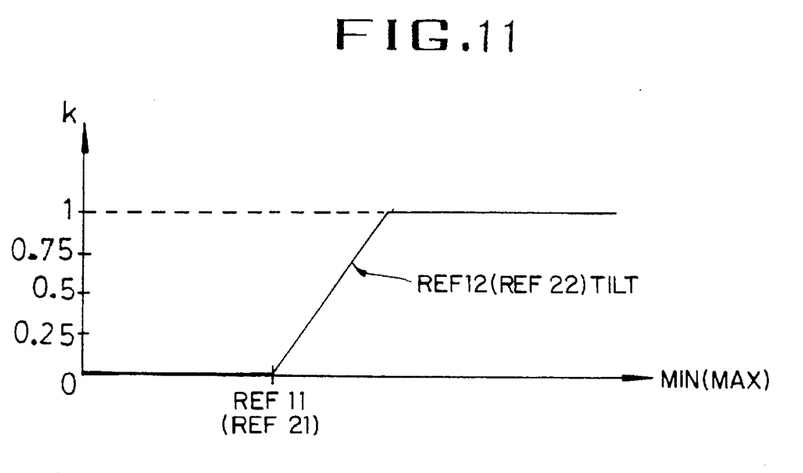
FIG. 11 is a characteristic diagram of mixed coefficients generated from the mixed coefficient generator illustrated in FIG. 5 and FIG. 9.

FIG. 11 is a characteristic diagram of the mixing coefficients (K1, 1-K1) or (K2, 1-K2) generated from the mixing coefficient generators 140 or 150 as shown in FIG. 5 and FIG. 9.

The mixing coefficient generator 140 in FIG. 9 subtracts the first reference value REF11 from the correlation coefficient MIN output from the correlation determination device 130 ant outputs "0" when the correlation coefficient MIN being input is smaller than the first reference value REF11.

Accordingly, the correlation coefficient becomes "0" when the correlation coefficient MIN is smaller than the first reference value REF11 as shown in FIG. 11.

When the correlation coefficient MIN is greater than the first reference value REF11 shown in FIG. 9, a value is output wherein the first reference value REF11 is subtracted from the correlation coefficient MIN.

The above-referenced value is multiplied by a predetermined value REF12 and becomes "0", as illustrated in FIG. 11, when the correlation coefficient MIN is greater than the first reference value REF11, a value wherein the predetermined value REF12 is multiplied by a difference between the correlation coefficient MIN and the first reference value REF11.

In other words, the value becomes a straight line having a slope changing according to the predetermined value REF12.

When the value output from the limiter reaches a point above a predetermined value, the same is output as "1".

Then, a signal is represented in a continuous line as shown in FIG. 11, which is called as a first mixing coefficient K1.

Meanwhile, when the predetermined value determined by the limiter is designated as "1" and when said "1" is subtracted by the first mixing coefficient K1, then a second mixing coefficient 1-K2 can be obtained.

The foregoing description has explained the operation of mixing coefficient generator 140 by way of example. However, another mixing coefficient generator 150 can be operated as above, to thereby generated a third mixing coefficient K2 by way of a greater correlation coefficient MAX, a second reference value REF21 and a predetermined value REF22, as illustrated in FIG. 11.

Furthermore, the fourth mixing coefficient 1-K2 can also be generated.

Figure 13:
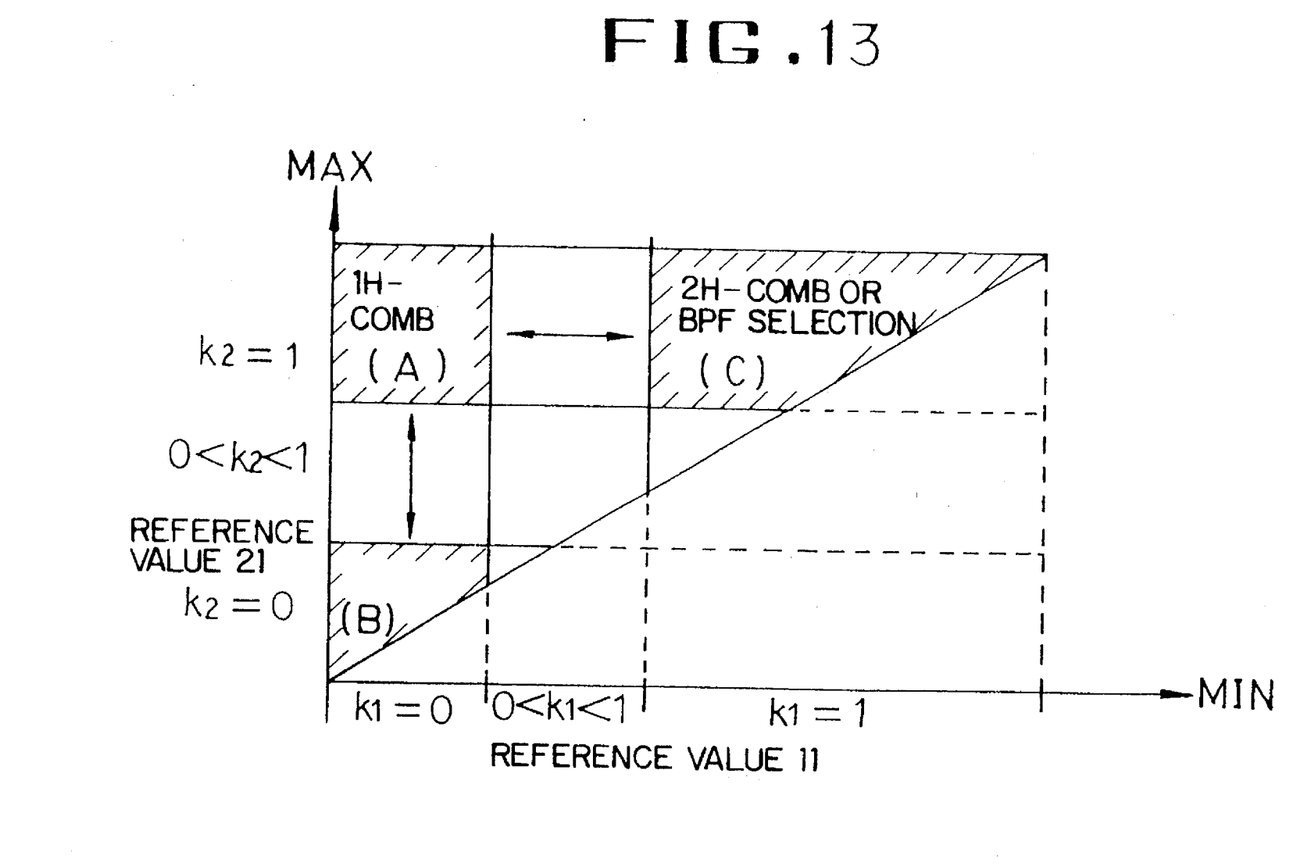
FIG. 13 is an illustrative drawing of a two-dimensional region for illustrating operational states produced according to the circuitry shown in FIG. 5.

FIG. 13 is an illustrative drawing of a two-dimensional region for illustrating an operational state shown in FIG. 5.

According to FIG. 5, the chrominance signal is output when the correction coefficient of lesser value MIN and correlation coefficient of greater value MAX are respectively smaller than the reference values REF11 and REF12 (K1=K2=0).

However, if the relationship of mixing coefficient K1 is "0<K1<1" while that of the mixing coefficient K2 is "K2= 1", the chrominance signal 1H-COMB is output.

The chrominance signal 1H-COMB is classified into BOTTOM-1H and TOP-1H, and according to the selection signal S1 output from the correlation determination device 130, the chrominance signal (BOTTOM-1H or TOP-1H) of greater correlation is selected and output.

If the relationship of the mixing coefficients (K1, K2) is K1=K2=1, the chrominance signal, 2H-COMB or BPF, is output by the selection from the outside according to a user.

If the relationship of the mixing coefficients (K1, K2) is O<K1<1 and O<K2<1, respectively, a chrominance signal mixed appropriately according to the mixing coefficients (K1, 2) is output from the chrominance signal processor 200 as illustrated in FIG. 5 and FIGS. 10A or 10B.

A luminance generator includes a subtractor 300 which subtracts the chrominance signal C processed in the chrominance signal processor 200 from the delay-matched composite video signal VH to thereby output the luminance signal Y.

As seen from the foregoing, the two-dimensional adaptation type luminance/chrominance signal separation apparatus provides a separated natural image by setting up two established values between the chrominance signals are mixed and thereafter output according to correlations.

The foregoing description and drawings are illustrative and are not to be taken as limiting. Still other variations and modifications are possible without departing from the spirit and scope of the present invention.

What is claimed is:

1. A two-dimensional adaptation type luminance/chrominance signal separation apparatus comprising:

coefficient generating means for determining correlations between time-separated composite video signals and for generating a selection signal and mixing coefficients;

chrominance signal process means for selectively outputting chrominance signals filtered from respective composite video signals according to said mixing coefficients generated by the coefficient generating means where said chrominance signals are generated by mixing respective chrominance signals filtered to lie within a predetermined bandwidth, in response to said selection signal; and luminance signal generating means for combining a chrominance signal generated from the chrominance signal process means with the composite video signal to produce a luminance signal.

2. A two-dimensional adaptation type luminance/chrominance signal separation apparatus as defined in claim 1, wherein the coefficient generating means comprises:

correlation detecting means for generating correlation coefficients in accordance with correlation between the composite video signal currently being input and respective 1H and 2H delayed composite video signals;

correlation determination means for dividing and providing the correlation coefficients generated from the correlation detecting means into a greater value and a lesser value and for outputting the selection signal for causing output of a selected chrominance signal having greater correlation out of filtered chrominance signals; and mixing coefficient generating means for generating mixing coefficients from the correlation coefficients divided and output from the correlation determination means in the greater value and the lesser value.

3. A two-dimensional adaptation type luminance/chrominance signal separation apparatus as defined in claim 2, wherein the correlation detecting means comprises:

a first correlation detecting unit for generating a first correlation coefficient according to correlations between the composite video signal and the 1H-delayed composite video signal; and a second correlation unit for generating a second correlation coefficient according to correlations between the 1H-delayed and 2H-delayed composite video signals.

4. A two-dimensional adaptation type luminance/chrominance signal separation apparatus as defined in claim 2, wherein correlation determination means comprises:

a comparator for comparing the first and second correlation coefficients output from the correlation detecting means to thereby output the selection signal; and correlation coefficient separating means for separately outputting a lesser correlation coefficient and a greater correlation coefficient according to the selection signals output from the comparator.

5. A two-dimensional adaptation type luminance/chrominance signal separation apparatus as defined in claim 4, wherein the correlation coefficient separating means includes:
- a first multiplexer for providing the lesser value of correlation coefficient according to the selection signal output from the comparator; and
- a second multiplexer for providing the greater correlation coefficient according to the selection signal output from the comparator.

6. A two-dimensional type luminance/chrominance signal separation apparatus as defined in claim 2, wherein the mixing coefficient generating means comprises:
- a subtractor for subtracting a first reference value from a lesser value of said correlation coefficient output from the correlation determination means;
- a comparator for comparing the lesser value of correlation coefficient output from the correlation determination means with the first reference value to thereby output the selection signal;
- a multiplexer for outputting "0" when the lesser value of correlation coefficient o is smaller than the first reference value according to the selection signal output from the comparator and for outputting the lesser value of correlation coefficient as is when the lesser value of correlation coefficient is greater than the first reference value;
- a multiplier for multiplying a signal output from the multiplexer by a predetermined value;
- a limiter for generating a first mixing coefficient for designating as "1" an output of the multiplier above a predetermined value; and
- a second subtractor for subtracting the first mixing coefficient from "1" to thereby output a second mixing coefficient.

7. A two-dimensional adaptation type luminance/chrominance signal separation apparatus as defined in claim 2, wherein the mixing coefficient generating means comprises:
- a subtractor for subtracting a first reference value from the greater correlation coefficient output from the correlation determination means;
- a comparator for comparing the greater value of correlation coefficient output from the correlation determination means with the first reference value to thereby output the selection signal;
- a multiplexer for outputting "0" when the correlation coefficient is smaller than the first reference value according to the selection signal output from the comparator and for outputting the correlation coefficient as is when the correlation coefficient is greater than the first reference value;
- a multiplier for multiplying a predetermined value with a signal output from the multiplexer;
- a limiter for generating a first mixing coefficient for designating as "1" an output of the multiplier above a predetermined value; and
- a subtractor for subtracting the first mixing coefficient from "1" to thereby output a second mixing coefficient.

8. A two-dimensional adaptation type luminance/chrominance signal separation apparatus as defined in claim 2, wherein the chrominance signal process means comprises:
- a first multiplexer for outputting the chrominance signal detected by a Band-Pass Filter from the composite video signal according to an external selection signal or for selectively outputting the chrominance signal calculated from the currently-input composite video signal, 1H-delayed composite video signal and 2H-delayed composite video signal;
- a second multiplexer for selectively outputting a chrominance signal calculated from the composite video signal and 1H-delayed composite video signal according to the selection signal output from the correlation determination means or for selectively outputting the chrominance signal calculated from the 1H-delayed composite video signal or 2H-delayed composite video signal;
- first and second multipliers for multiplying the chrominance signal output from the first and second multiplexers by first and second mixing coefficients generated from the lesser value of correlation coefficient;
- a first adder for adding the chrominance signals output from first and second multipliers;
- a third multiplier for multiplying the chrominance signal output from the first adder by a third mixing coefficient generated from a greater correlation coefficient;
- a fourth multiplier for multiplying the chrominance signals calculated from currently-input composite video signal, 1H-delayed composite video signal and 2H-delayed composite video signal by a fourth mixing coefficient generated from said greater value of correlation coefficient; and
- a second adder for outputting a chrominance signal by adding outputs of the third and fourth multipliers.

9. A two-dimensional adaptation type luminance/chrominance signal separation apparatus as defined in claim 2, wherein the chrominance signal process means comprises:
- a first multiplexer for outputting one of the chrominance signals detected by the Band-Pass Filter from the composite video signal according to an external selection signal and for selectively outputting the chrominance signal calculated form the currently-input composite video signal, 1H-delayed composite video signal and 2H-delayed composite video signal;
- a second multiplexer for selectively outputting a chrominance signal calculated from the composite video signal and 1H-delayed composite video signal according to the selection signal output from the correlation determination means or for selectively outputting the chrominance signal calculated from the 1H-delayed composite video signal or 2H-delayed composite video signal;
- a first multiplier for multiplying the chrominance signal output from the second multiplexer by a first mixing coefficient generated from the greater value of the correlation coefficient;
- a second multiplier for multiplying a second mixing coefficient generated from the greater correlation coefficient by the chrominance signal calculated from the composite video signal, 1H-delayed composite video signal and 2H-delayed composite video signal;
- a first adder for adding the chrominance signal output from the first and second multipliers;
- a third multiplier for multiplying the chrominance signal output from the first multiplexer for a third mixing coefficient generated from a lesser correlation coefficient;
- a fourth multiplier for multiplying the chrominance signal output from the first adder by a fourth mixing coefficient generated from the lesser value of correlation coefficient; and a second adder for outputting a chrominance signal by adding outputs of the third and fourth multipliers.

10. A two-dimensional adaptation type luminance/chrominance signal separation apparatus as defined in claim 8, wherein the chrominance signal detected by the Band-Pass Filter is detected by the 1H-delayed composite video signal.

11. A two-dimensional adaptation type luminance/chrominance signal separation apparatus as defined in claim 8, wherein the chrominance signal calculated from the composite video signal and the 1H-delayed composite video signal is produced by a circuit comprising:

a subtractor for seeking a difference between the composite video signal and 1H-delayed composite video signal; and a level converter for dividing by ½ the chrominance signal output from the subtractor.

12. A two-dimensional adaptation type luminance/chrominance signal separation apparatus as defined in claim 8, wherein the chrominance signal calculated from the 1H-delayed composite video signal and the 2H-delayed composite video signal is produced by a circuit comprising:

a subtractor for seeking a difference between the 1H-delayed composite video signal and 2H-delayed composite video signal; and a level converter for dividing by ½ the chrominance signal output from the subtractor.

13. A two-dimensional adaptation type luminance/chrominance signal separation apparatus as defined in claim 8, wherein the chrominance signal calculated from the composite video signal, 1H-delayed composite video signal and 2H-delayed composite video signal is produced by a circuit comprising:

an adder for adding the chrominance signals calculated from the composite video signal and 1H-delayed composite video signal to the chrominance signals calculated from the 1H-delayed composite video signal and 2H-delayed composite video signal; and a level converter for dividing by ½ the chrominance signal output from the adder.

14. A two-dimensional adaptation type luminance/chrominance signal separation apparatus as defined in claim 1, wherein the luminance signal generating means includes a subtractor for outputting the luminance signal by subtracting the chrominance signal processed by the chrominance signal process means from a delay-matched composite video signal.

15. A two-dimensional adaptation type luminance/chrominance signal separation apparatus as defined in claim 1, further comprising a Band-Pass Filter for passing only a predetermined chrominance signal bandwidth to an output terminal of the chrominance signal process means.

16. A two-dimensional adaptation type luminance/chrominance signal separation apparatus comprising:

coefficient generating means for providing correlation coefficients permitting generation of a selection signal and mixing coefficients, whereby each of said correlation coefficients is based on respective correlations between time-separated composite video signals;

chrominance signal process means for selectively generating chrominance signals filtered from respective composite video signals according to said mixing coefficients generated by the coefficient generating means, wherein said chrominance signals are generated by mixing respective chrominance signals filtered to lie within a predetermined bandwidth responsive to said selection signal; and luminance signal generating means for subtracting said chrominance signals generated from respective composite video signals to thereby produce luminance signals.

17. The two-dimensional adaptation type luminance/chrominance signal separation apparatus as defined in claim 16, wherein the coefficient generating means comprises:

correlation detecting means for generating correlation coefficients responsive to correlations between a composite video signal currently being input and respective 1H and 2H delayed composite video signals;

correlation determination means for dividing and providing the correlation coefficients generated by said correlation detecting means into a greater value and a lesser value and for generating said selection signal for causing output of a selected chrominance signal having a greater correlation out of filtered chrominance signals; and mixing coefficient generating means for generating mixing coefficients from the correlation coefficients output by said correlation determination means.

18. The two-dimensional adaptation type luminance/chrominance signal separation apparatus as defined in claim 16, wherein the luminance signal generating means comprises:

a subtractor for generating said luminance signals by subtracting said chrominance signal processed by the chrominance signal process means from respective delay-matched composite video signals.

19. The two-dimensional adaptation type luminance/chrominance signal separation apparatus as defined in claim 16, further comprising:

a Band-Pass Filter for passing only a predetermined chrominance signal bandwidth to an output terminal of said chrominance signal process means.

* * * * *